US011884875B2

(12) United States Patent
Cole et al.

(10) Patent No.: US 11,884,875 B2
(45) Date of Patent: Jan. 30, 2024

(54) ASPHALTENE DISPERSANTS

(71) Applicant: Cameron International Corporation, Houston, TX (US)

(72) Inventors: Rachael Cole, Sandnes (NO); Astrid Lone, Sandnes (NO); Neil David Feasey, Southampton (GB); Tore Nordvik, Sandnes (NO)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 17/618,263

(22) PCT Filed: Jun. 22, 2020

(86) PCT No.: PCT/US2020/038871
§ 371 (c)(1),
(2) Date: Dec. 10, 2021

(87) PCT Pub. No.: WO2020/257747
PCT Pub. Date: Dec. 24, 2020

(65) Prior Publication Data
US 2022/0306927 A1    Sep. 29, 2022

Related U.S. Application Data

(60) Provisional application No. 62/864,658, filed on Jun. 21, 2019.

(51) Int. Cl.
*C09K 8/524* (2006.01)
*C09K 8/536* (2006.01)

(52) U.S. Cl.
CPC .............. *C09K 8/524* (2013.01); *C09K 8/536* (2013.01)

(58) Field of Classification Search
None
See application file for complete search history.

(56) References Cited

U.S. PATENT DOCUMENTS 3,347,789 A    10/1967  Dickson
5,700,395 A    12/1997  Thetford et al.
(Continued)

FOREIGN PATENT DOCUMENTS

WO    2016019052 A1    2/2016
WO    2016070044 A1    5/2016
(Continued)

OTHER PUBLICATIONS

International Search Report and Written Opinion issued in PCT/US2020/038871, dated Oct. 6, 2020 (10 pages).

*Primary Examiner* — John J Figueroa
(74) *Attorney, Agent, or Firm* — Jeffrey D. Frantz

(57) ABSTRACT

Compositions and methods for preventing the formation of aggregates and for dispersing aggregates and other poorly soluble materials in hydrocarbon fluids. The compositions include an asphaltene dispersant prepared from the reaction of a polyethyleneimine (PEI) dendrimer and one or more derivatizing reagents wherein the polyethyleneimine dendrimer has a weight average molecular weight of greater than or equal to 9 kDa. The methods include emplacing in a wellbore a composition comprising an asphaltene inhibitor, wherein the asphaltene inhibitor is a compound prepared from the reaction of a polyethyleneimine dendrimer and one or more derivatizing reagents wherein the polyethyleneimine dendrimer has a weight average molecular weight of greater than or equal to 9 kDa.

20 Claims, 2 Drawing Sheets

(56) References Cited

U.S. PATENT DOCUMENTS

| | | |
|---|---|---|
| 6,140,276 A | 10/2000 | Duncum et al. |
| 6,787,600 B1 | 9/2004 | Thetford et al. |
| 7,795,183 B2 | 9/2010 | Wilkes et al. |
| 10,087,382 B2 | 10/2018 | Nordvik |
| 2004/0163995 A1* | 8/2004 | Cornelisse .............. C10L 1/238 208/48 AA |
| 2006/0106265 A1* | 5/2006 | Rivers ...................... C09K 8/52 585/15 |
| 2007/0027046 A1 | 2/2007 | Friend et al. |
| 2014/0130581 A1* | 5/2014 | Ovalles .................... C09K 8/04 208/309 |
| 2016/0222278 A1 | 8/2016 | Cole et al. |
| 2019/0211249 A1* | 7/2019 | Cole ....................... C09K 8/035 |
| 2020/0157415 A1* | 5/2020 | Quintero ............... E21B 43/267 |

FOREIGN PATENT DOCUMENTS

| | | |
|---|---|---|
| WO | 2016073574 A1 | 5/2016 |
| WO | 2016200856 A1 | 12/2016 |
| WO | 2017192658 A1 | 11/2017 |
| WO | 2018218362 A1 | 12/2018 |

\* cited by examiner

ASPHALTENE DISPERSANTS

CROSS-REFERENCE TO RELATED APPLICATIONS

This application claims priority to U.S. Patent Application No. 62/864,658, filed on Jun. 21, 2019, which is herein incorporated by reference in its entirety.

BACKGROUND

In the oil and gas industry, fluids produced from subterranean formations often contain varying levels of hydrocarbons, associated aqueous phases, and dissolved and suspended solids. During production operations, hydrocarbons may be depressurized and cooled during capture and various flow assurance challenges can arise that may negatively affect production and other downstream processes. Among these considerations, it may be important to control of precipitation and deposition of solids such as waxes, organic and inorganic scales, asphaltenes, hydrates, corrosion products, and formation solids.

Solids present in hydrocarbon-containing produced from subterranean formations may be only slightly soluble at reservoir pressure and temperature. As produced fluids undergo pressure and temperature changes during production, solids may precipitate from the fluids and deposit on downhole tools, pipe wall surface, tubes, tanks, and other equipment. Solid deposition may cause additional operational problems such as poor oil and water separation, increased fluid viscosity, and pressure drops in the production and transportation pipelines; all of which can cause reductions in output and substandard oil and water quality.

DETAILED DESCRIPTION

Figure 1:
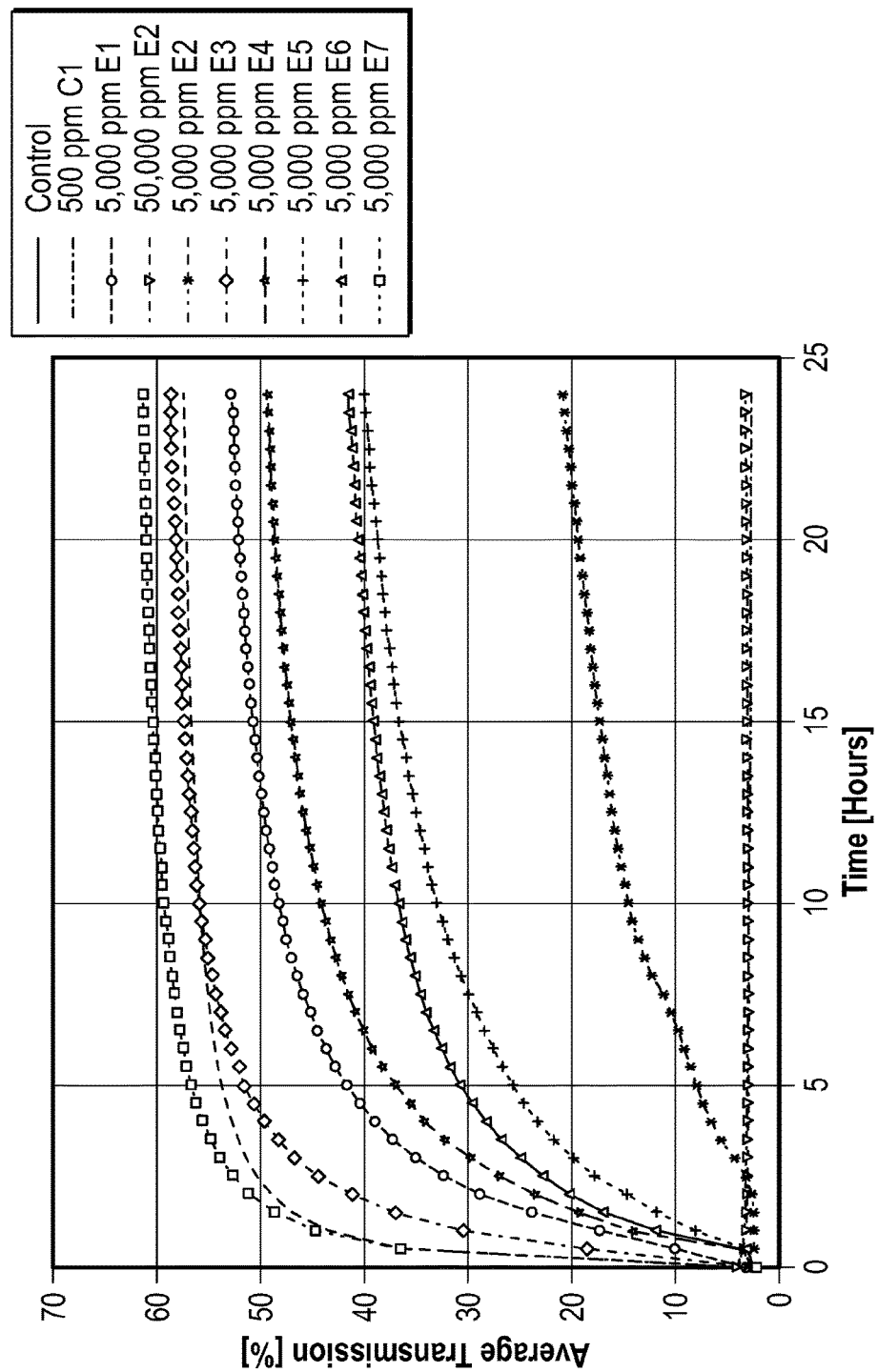
FIG. 1 is a graphical representation depicting the average transmission as a function of time through a sample of crude oil treated with an asphaltene dispersants in accordance with embodiments of the present disclosure.

This disclosure relates generally to asphaltene dispersants designed to prevent the formation of and disperse aggregates and other poorly soluble materials in hydrocarbon fluids. In one or more embodiments, asphaltene dispersants may include dendrimeric polyethyleneimine (PEI) derivatives in which surface amine moieties are functionalized with hydrophobic derivatizing reagents such as fatty acids and aromatic acids. PEI derivatives in accordance with the present disclosure may function as asphaltene inhibitors and dispersants that prevent the aggregation and propagation of wax crystals grown in hydrocarbon fluids.

At reservoir temperatures, hydrocarbons may be primarily liquid or gaseous. As the production stream rises to the surface and leaves the wellhead, the temperature and pressure start to decrease; the stream begins to cool from the elevated temperature and pressure as compared to the temperature and pressure of the wellhead. This chilling may have a number of effects, including gelling, undesirable rheology changes, or deposition of asphaltenes, waxes, and the like, which may affect downstream production operations. For example, asphaltenes have low solubility at surface temperature and pressure, which can lead to deposit formation. Asphaltene deposits can cause potential operational problems, such as the creation of buildups during production and/or transportation. Particularly, when asphaltenes and/or waxes condense onto cooled surfaces such as pipes walls and teller lines the result is blockage and reduced fluid flow. Blockages are often an issue when transporting hydrocarbons in subsea flowlines, where pipe walls may accumulate solid buildup. Further, sludge formation during shipping in storage tanks may result in the loss of a percentage of the shipped hydrocarbon.

In one or more embodiments, PEI derivatives in accordance with the present disclosure may be used to eliminate or reduce asphaltene aggregation. PEI derivatives in accordance with embodiments described herein may be added to asphaltene-containing fluids such as liquid natural gas, crude oil, shale oil, petroleum, tar sands oil, and the like, to mitigate the effects undesirable solids formation and precipitation. When added to hydrocarbon fluids, PEI derivatives may stabilize poorly soluble components, delaying or eliminating their precipitation and reducing overall deposition. In one or more embodiments, PEI derivatives may function by changing the crystal morphology and intermolecular interaction of asphaltenes and other slightly soluble species. While not limited by any particular theory, it is proposed that this effect is due in part to an interaction between hydrophobic domains of the PEI derivative and asphaltenes that alters aggregation, preventing asphaltene accumulation. As a result, the formation of dense asphaltene aggregates that lead to deposition is reduced.

PEI Dendrimers

In one or more embodiments, PEI derivatives may be the product of a reaction of a PEI dendrimer or polymer with one or more derivatizing reagents such as fatty acids and aromatic acids. PEI derivatives in accordance with the present disclosure may also be functionalized with specific chemical moieties in order to provide improved solubility within an oil-based fluid or a water-based fluid, depending upon the application, and/or to provide for end-use functionality as a production chemical.

An example of the chemical structure of a polyethylenimine (PEI) type dendrimer is shown below.

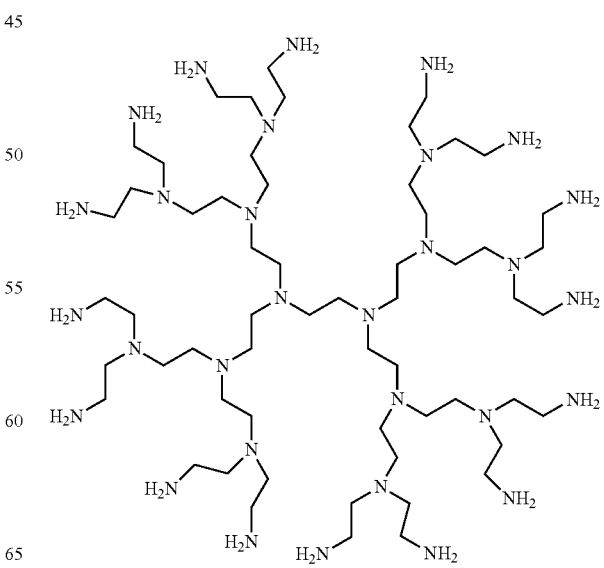

In one or more embodiments, the average molecular weight of the PEI dendrimer or PEI derivative range from a lower limit selected from 5 kDa, 9 kDa, 9.5 kDa, 10 kDA, and 15 kDa, to an upper limit selected from 10 kDa, 20 kDa, 25 kDa, and 50 kDa, where any upper limit may be paired with any lower limit. In some embodiments, the polyethyleneimine dendrimer may have a weight average molecular weight of greater than or equal to 9 kDa prior to derivatization. PEI dendrimers in accordance with the present disclosure may include commercially available products such as the LUPASOL™ family of dendrimers from BASF, and the EPOMIN™ from Nippon Shokubai Co., Ltd.

PEI dendrimers may be functionalized by any suitable chemical reactions, including amidation, transamidation, and the like. In one or more embodiments, the PEI dendrimers of the present disclosure may be functionalized by one or more derivatizing reagents at varying degrees of substitution. PEI dendrimers in accordance with the present disclosure may have a degree of substitution having a lower limit selected from 10%, 20%, 30%, and 40%, to an upper limit selected from 60%, 80%, 90%, and 100%, where the any upper limit may be paired with any lower limit.

Derivatizing Reagents

Derivatizing reagents in accordance with the present disclosure may include branched/linear, aromatic, saturated/unsaturated fatty acids having a carbon number within the range of C4 to C50. In some embodiments, derivatizing reagents in accordance with the present disclosure may include linear fatty acids such as butyric acid, valeric acid, caproic acid, enanthic acid, caprylic acid, pelargonic acid, capric acid, undecylic acid, lauric acid, tridecyclic acid, myristic acid, pentadecylic acid, palmitic acid, margaric acid, stearic acid, behenic acid, cerotic acid, and the like, in addition to unsaturated fatty acids such as myristoleic acid, palmitoleic acid, oleic acid, linoleic acid, alpha-linoleic acid, erucic acid, ricinoleic acid, and the like. Fatty acids suitable for use as derivatizing agents may also include blends of saturated and/or unsaturated fatty acids obtained from synthetic blends or natural oils such as tall oils, coconut oils, palm oil, palm kernel oil, tallow oils, and the like.

In one or more embodiments, the derivatizing reagent may be a saturated aliphatic hydrocarbon having 16 or more carbon atoms. In some embodiments, derivatizing reagents may include branched fatty acids, and mixtures thereof, such as isobutyric acid, isovaleric acid, 2-ethylbutyric acid, ethylmethylacetic acid, isoheptanoic acid, 2-ethylhexanoic acid, isononanoic acid, isodecanoic acid, isotridecanoic acid, isomyristic acid, isopalmitic acid, isostearic acid, isoarachidic acid, isohexacosanoic acid, and the like. In one or more embodiments, PEI dendrimers may be derivatized with aromatic acids such as methyl salicylate, salicylic acid, indole acetic acid, indole butyric acid, dodecylbenzenesulfonic acid, picolinic acid, naphthoxyacetic acid, and the like.

In one or more embodiments, two or more derivatizing reagents may be used to derivatize PEI dendrimers in accordance with the present disclosure. In some embodiments, derivatizing reagent may be selected and combined on the basis of their solubility in the fluid to be treated in order to modify the solubility of the derivatized PEI. For example, a mixture of derivatizing reagents may include a fraction of reagent having a carbon chain that imparts solubility in a hydrocarbon fluid, such as a derivatizing reagent having a carbon number of C16 or less, and a fraction of reagent tailored to interact with asphaltenes and other poorly soluble components, such as a derivatizing reagent having a carbon number greater than C22. Mixtures of derivatizing reagents may include mixtures of two or more reagents in some embodiments, three or more in other embodiments, and mixtures of four or more in some embodiments. Other aspects of the derivatizing reagent may also be tuned including the degree of branching and saturation, depending on the nature of the hydrocarbon fluid to be treated and the types of asphaltenes present in the fluid.

Asphaltene dispersants may be prepared from a reaction of a PEI dendrimer and a mixture of two derivatizing reagents combined at a ratio having a lower limit selected from any of 1:1, 2:1, and 3:1, ranging to an upper limit selected from any of 5:1, 10:1, and 20:1, where any lower limit may be paired with any upper limit. In some embodiments, asphaltene dispersants may be prepared from a reaction of a PEI dendrimer and three derivatizing reagents combined at a ratio having a lower limit selected from any of 1:x:1, 2:x:1, and 3:x:1, ranging to an upper limit selected from any of 5:x:1, 10:x:1, and 20:x:1, where any lower limit may be paired with any upper limit, and wherein x is a value between 1 and 20. In some embodiments, asphaltene dispersants may be prepared from a reaction of a PEI dendrimer and four derivatizing reagents combined at a ratio having a lower limit selected from any of 1:x:y:1, 2:x:y:1, and 3:x:y:1, ranging to an upper limit selected from any of 5:x:y:1, 10:x:y:1, and 20:x:y:1, where any lower limit may be paired with any upper limit, and wherein x and y are independently selected from values between 1 and 20.

PEI derivatives in accordance with the present disclosure may have a solubility in xylene at room temperature of greater than or equal to 5% in some embodiments, and greater than or equal to 10% in other embodiments. In some embodiments, PEI derivatives may have a solubility in xylene at room temperature that may range from a lower limit selected from any one of 1%, 2%, and 5%, to an upper limit selected from any one of 5%, 10%, and 25%, where any lower limit may be paired with any upper limit.

Applications

During application, in one or more embodiments, PEI derivatives may be injected from a surface source into wells or into flow lines to treat formation fluids to prevent or control precipitation. Methods in accordance with the present disclosure may include admixing an PEI derivative with a hydrocarbon fluid in an effective amount, i.e., an amount sufficient to produce some reduction in the appearance of waxes or poorly soluble aggregates at decreased temperatures as compared to an untreated fluid.

In one or more embodiments, asphaltene inhibitors in accordance with the present disclosure may be added at a concentration in parts per million (ppm) that may range from a lower limit selected from any of 1 ppm, 10 ppm, 100 ppm, 1,000 ppm, and 2,000 ppm to an upper limit selected from any of 5,000 ppm, 10,000 ppm, 25,000 ppm, 40,000 ppm, and 50,000 ppm, where the concentration of the PEI derivative may range from any lower limit to any upper limit.

However, one skilled in the art would appreciate that the desired concentration of PEI derivative may depend on the type of fluid being treated, and that the desirable amount is an amount sufficient to achieve the highest variance in asphaltene aggregation and viscosity at the lowest reasonable dosage. The final concentration (for a stationary fluid) or rate of addition (for a flowing stream) of PEI derivative may vary according to a number of factors that may include the base fluid type, asphaltene content in the fluid, carbon number distribution of the fluid, type of inhibitor added, degree of wax appearance temperature and viscosity corrections desired, ambient conditions, presence of aqueous phases, and the like. The optimum dosage rate may be estimated by a number of laboratory measurements such as wax appearance temperature, viscosity, gel strength, asphaltene deposition tendency, and the like.

Aromatic Solvent

In one or more embodiments, asphaltene inhibitors may be used in conjunction with one or more aromatic solvents that may increase the dispersion and/or inhibitory effects of the treatment. Aromatic solvents in accordance with the present disclosure may be combined with an asphaltene inhibitor prior to injection downhole or subsequent to the injection of the asphaltene inhibitor or other wellbore fluid. Suitable aromatic solvents that may be used as a component of compositions in accordance with the present disclosure include benzenes, alkyl benzenes such as toluene, xylene, ethylbenzene, trimethyl benzene, cumene, mesitylene, combinations thereof, and the like. While a number of solvents are disclosed, it is also envisioned that other solvents may be selected that are miscible with petroleum fluids such as crude oil, condensates, diesel, and the like.

In one or more embodiments, wellbore treatment compositions may contain one or more aromatic solvents at a percent by volume (vol %) that ranges from 5 vol %, 10 vol %, 25 vol %, and 50 vol % to an upper limit selected from any of 50 vol %, 60 vol %, 90 vol %, and 95 vol %, where the concentration of the aromatic solvent may range from any lower limit to any upper limit.

EXAMPLES

The following examples are presented to show the asphaltene inhibition performance of PEI derivative asphaltene dispersants in accordance with embodiments of the present specification.

Example 1: PEI Derivative Dispersants

PEI derivative asphaltene dispersants were prepared by amidating PEI dendrimer cores with a selected derivatizing reagent. Amidation reactions were carried out under Dean-Stark conditions in refluxing xylene at 180° C. The degree of substitution was then quantified for each sample using known methods.

Samples were tested for their performance as an asphaltene inhibitor (AD) in crude oil at a concentration of 500 ppm for a period of 24 hours. During testing, a 1:1 ratio of crude oil and xylene was treated with a 1% solution of dispersant in xylene. Samples were then analyzed qualitatively over a period of 24 hours for the presence of asphaltene precipitation. Samples were also assayed for their maximum solubility in xylene. Sample reactants and assay results are shown in Table 1. All samples displayed in Table 1 inhibited asphaltene precipitation for at least 2 hours, while samples 6-14 maintained inhibition for the 24 hour period surveyed.

TABLE 1

Sample formulations for Example 1

| Sample | PEI Dendrimer MW (kDa) | Derivatizing Reagent(s) | % Substitution | Solubility in Xylene (RT) |
|---|---|---|---|---|
| 1 | 25 | Palmitic Acid | 75 | 1% |
| 2 | 5 | Palmitic Acid | 50 | 1% |
| 3 | 5 | Stearic Acid | 50 | 1% |
| 4 | 2 | Palmitic Acid | 50 | 5% |
| 5 | 1.3 | Stearic Acid | 50 | 5-10% |
| 6 | 10 | Palmitic Acid | 50 | 5-10% |
| 7 | 10 | Palmitic Acid | 75 | — |
| 8 | 10 | Stearic Acid | 50 | 1% |
| 9 | 10 | Stearic Acid | 75 | 1% |
| 10 | 10 | Lauric Acid + Behenic Acid (0.2: 0.8) | 100 | — |
| 11 | 10 | Lauric Acid + Palmitic Acid + Behenic Acid (0.2: 0.2: 0.6) | 100 | — |
| 12 | 10 | Lauric Acid + Palmitic Acid + Behenic Acid (0.2: 0.4: 0.4) | 100 | 1-5% |
| 13 | 10 | Lauric Acid + Palmitic Acid + Behenic Acid (0.2: 0.6: 0.2) | 100 | 1-5% |
| 14 | 10 | Lauric Acid + Palmitic Acid (0.2: 0.8) | 100 | 1-25% |
| 15 | 10 | Tall-oil Fatty Acid | 100 | 5-25% |
| 16 | 10 | Lauric Acid + Palmitic Acid + Behenic Acid + Methyl Salicylate (0.2: 0.3: 0.2: 0.3) | 100 | 5% |
| 17 | 10 | Lauric Acid + Palmitic Acid + Behenic Acid + DDBSA (0.2: 0.3: 0.2: 0.3) | 100 | 5% |
| 18 | 10 | Lauric Acid + Palmitic Acid + Behenic Acid + Ricinoleic Acid (0.2: 0.3: 0.2: 0.3) | 100 | 5% |
| 19 | 10 | Lauric Acid + Palmitic Acid + Behenic Acid + Picolinic Acid (0.2: 0.3: 0.2: 0.3) | 100 | 5% |
| 20 | 10 | Lauric Acid + Palmitic Acid + Behenic Acid + 2-Naphthoxyacetic Acid (0.2: 0.3: 0.2: 0.3) | 100 | 5% |

Example 2

In the next example, samples were tested for their performance over time as an asphaltene inhibitor (AD) against a comparative dispersant Flowsolve™ 110 from Croda. Sample formulations are shown in Table 2.

TABLE 2

Sample formulations for Example 2

| Sample | PEI core MW (kDa) | Derivatizing reagent(s) | % Substitution |
|---|---|---|---|
| E1 | 5 | Palmitic Acid | 50 |
| E2 | 10 | Palmitic Acid | 50 |
| E3 | 25 | Lauric Acid + Palmitic Acid (0.2: 0.8) | 100 |
| E4 | 10 | Lauric Acid + Palmitic Acid (0.2: 0.8) | 100 |
| E5 | 10 | Tall-oil Fatty Acid | 100 |
| E6 | 10 | Lauric Acid + Palmitic Acid + Behenic Acid + Ricinoleic Acid (0.2: 0.3: 0.2: 0.3) | 100 |
| E7 | 10 | Lauric Acid | 90 |

Turbiscan Measurements

Samples were assayed using Formulaction's Turbiscan™ MA2000 to evaluate the static performance of asphaltene dispersants in crude oil by observing the formation of asphaltene aggregates over time. Following dilution and mixing with a solvent and a dispersant, a sample is then observed by a number of scans over a period of time (from 15 minutes to 24 hours). During the assay, the transmission is recorded and any changes in transmission, i.e., increases in light transmission, are attributed to asphaltene agglomerating and settling from solution. Results for the samples shown in Table 1 are plotted in FIG. 1. In the results, 50,000 ppm concentration of E2 exhibits similar performance to the comparative asphaltene dispersant C1.

Figure 2:
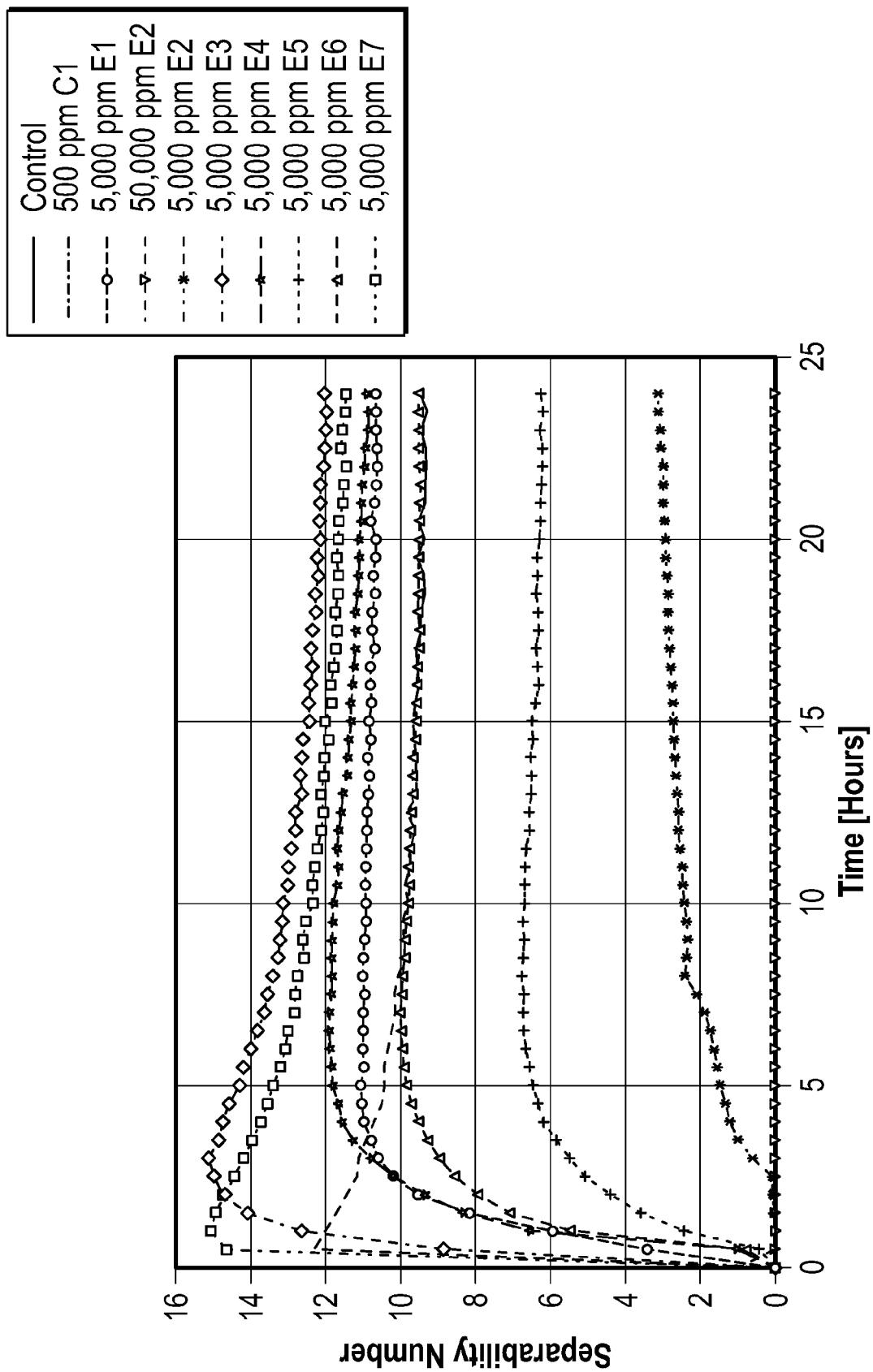
FIG. 2 is a graphical representation depicting the separability number as a function of time for a sample of crude oil treated with asphaltene dispersants in accordance with embodiments of the present disclosure.

In addition, by observing the percentage of light transmission for an individual sample it is possible to obtain a separability number (SN) for dilutions of 1:3, 1:6, and 1:9 (oil:xylene). SN indicates the resistance of a residual fuel oil to form sludge. High separability number is an indication of asphaltene aggregation resulting a poor stability reserve of the oil. Results for the samples listed in Table 2 are plotted in FIG. 2. In the results, 50,000 ppm concentration of E2 exhibits similar performance to the comparative asphaltene dispersant C1.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A composition comprising:
    an asphaltene dispersant being a product of a reaction of a polyethyleneimine (PEI) dendrimer and one or more derivatizing reagents selected from the group consisting of fatty acids and aromatic acids, wherein the polyethyleneimine dendrimer has a weight average molecular weight of greater than or equal to 9 kDa, and wherein the asphaltene dispersant has a solubility in xylene of greater than or equal to 5%.

2. The composition of claim 1, wherein the asphaltene dispersant is the product of a reaction between the PEI dendrimer and two or more derivatizing reagents, wherein at least one of the two or more derivatizing reagents has a carbon number of C16 or less, and at least one of the two or more derivatizing reagents has a carbon number greater than C22.

3. The composition of claim 1, wherein the asphaltene dispersant is the product of a reaction between the PEI dendrimer and two derivatizing reagents, wherein the two derivatizing reagents are reacted with the PEI dendrimer at a ratio that ranges from 1:1 to 5:1.

4. The composition of claim 1, wherein the asphaltene dispersant is the product of a reaction between the PEI dendrimer and three derivatizing reagents, wherein the three derivatizing reagents are reacted with the PEI dendrimer at a ratio that ranges from 1:x:1 to 5:x:1, wherein x is a value between 1 and 20.

5. The composition of claim 1, wherein the asphaltene dispersant is the product of a reaction between the PEI dendrimer and four derivatizing reagents, wherein the four derivatizing reagents are reacted with the PEI dendrimer at a ratio that ranges from 1:x:y:1 to 5:x:y:1, wherein x and y are independently selected from values between 1 and 20.

6. The composition of claim 1, wherein the asphaltene dispersant has a number average molecular weight in a range of 9.5 kDa to 20 kDa.

7. The composition of claim 1, wherein a degree of substitution of the PEI dendrimer with the one or more derivatizing reagents ranges from 30% to 100%.

8. The composition of claim 1, wherein the one or more derivatizing reagents comprise fatty acids and wherein the fatty acids are selected from the group consisting of butyric acid, valeric acid, caproic acid, enanthic acid, caprylic acid, pelargonic acid, capric acid, undecylic acid, lauric acid, tridecyclic acid, myristic acid, pentadecylic acid, palmitic acid, margaric acid, stearic acid, behenic acid, cerotic acid, myristoleic acid, palmitoleic acid, oleic acid, linoleic acid, alpha-linoleic acid, erucic acid, ricinoleic acid, isobutyric acid, isovaleric acid, 2-ethylbutyric acid, ethylmethylacetic acid, isoheptanoic acid, 2-ethylhexanoic acid, isononanoic acid, isodecanoic acid, isotridecanoic acid, isomyristic acid, isopalmitic acid, isostearic acid, isoarachidic acid, isohexacosanoic acid, tall oils, coconut oils, palm oil, palm kernel oil, and tallow oils.

9. The composition of claim 1, wherein the one or more derivatizing reagents comprise aromatic acids and wherein the aromatic acids are selected from the group consisting of methyl salicylate, salicylic acid, indole acetic acid, indole butyric acid, dodecylbenzenesulfonic acid, picolinic acid, and naphthoxyacetic acid.

10. The composition of claim 1, wherein the composition further comprises an aromatic solvent.

11. The composition of claim 10, wherein the aromatic solvent is selected from the group consisting of benzenes, alkyl benzenes, crude oil, condensates, and diesel.

12. A method comprising:
    emplacing in a wellbore a composition comprising an asphaltene dispersant, wherein the asphaltene dispersant is a product of a reaction of a polyethyleneimine (PEI) dendrimer and one or more derivatizing reagents selected from the group consisting of fatty acids and aromatic acids, wherein the polyethyleneimine dendrimer has a weight average molecular weight of greater than or equal to 9 kDa, and wherein the asphaltene dispersant has a solubility in xylene of greater than or equal to 5%.

13. The method of claim 12, wherein the asphaltene dispersant is the product of a reaction between the PEI dendrimer and two or more derivatizing reagents, wherein at least one of the two or more derivatizing reagents has a carbon number of C16 or less, and at least one of the two or more derivatizing reagents has a carbon number greater than C22.

14. The method of claim 12, wherein the asphaltene dispersant is the product of a reaction between the PEI dendrimer and two derivatizing reagents, wherein the two derivatizing reagents are reacted with the PEI dendrimer at a ratio that ranges from 1:1 to 5:1.

15. The method of claim 12, wherein the asphaltene dispersant is the product of a reaction between the PEI dendrimer and three derivatizing reagents, wherein the three derivatizing reagents are reacted with the PEI dendrimer at a ratio that ranges from 1:x:1 to 5:x:1, wherein x is a value between 1 and 20.

16. The method of claim 12, wherein the asphaltene dispersant is the product of a reaction between the PEI dendrimer and four derivatizing reagents, wherein the four derivatizing reagents are reacted with the PEI dendrimer at a ratio that ranges from 1:x:y:1 to 5:x:y:1, wherein x and y are independently selected from values between 1 and 20.

17. The method of claim 12, wherein the asphaltene dispersant has a number average molecular weight in a range of 5 kDa to 20 kDa.

18. The method of claim 12, wherein a degree of substitution of the asphaltene dispersant ranges from 10% to 100%.

19. The method of claim 12, wherein the one or more derivatizing reagents comprise fatty acids and wherein the fatty acids are selected from the group consisting of butyric acid, valeric acid, caproic acid, enanthic acid, caprylic acid, pelargonic acid, capric acid, undecylic acid, lauric acid, tridecyclic acid, myristic acid, pentadecylic acid, palmitic acid, margaric acid, stearic acid, behenic acid, cerotic acid, myristoleic acid, palmitoleic acid, oleic acid, linoleic acid, alpha-linoleic acid, erucic acid, ricinoleic acid, isobutyric acid, isovaleric acid, 2-ethylbutyric acid, ethylmethylacetic acid, isoheptanoic acid, 2-ethylhexanoic acid, isononanoic acid, isodecanoic acid, isotridecanoic acid, isomyristic acid, isopalmitic acid, isostearic acid, isoarachidic acid, isohexacosanoic acid, tall oils, coconut oils, palm oil, palm kernel oil, and tallow oils.

20. The method of claim 12, wherein the one or more derivatizing reagents comprise aromatic acids and wherein the aromatic acids are selected from the group consisting of methyl salicylate, salicylic acid, indole acetic acid, indole butyric acid, dodecylbenzenesulfonic acid, picolinic acid, and naphthoxyacetic acid.

\* \* \* \* \*